Aug. 9, 1966 W. E. BRADLEY 3,265,372
AIR DISTRIBUTION SYSTEM
Filed Feb. 27, 1964
Fig. 1.
Fig. 2.
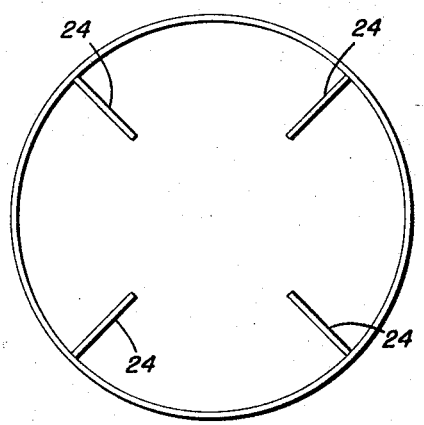
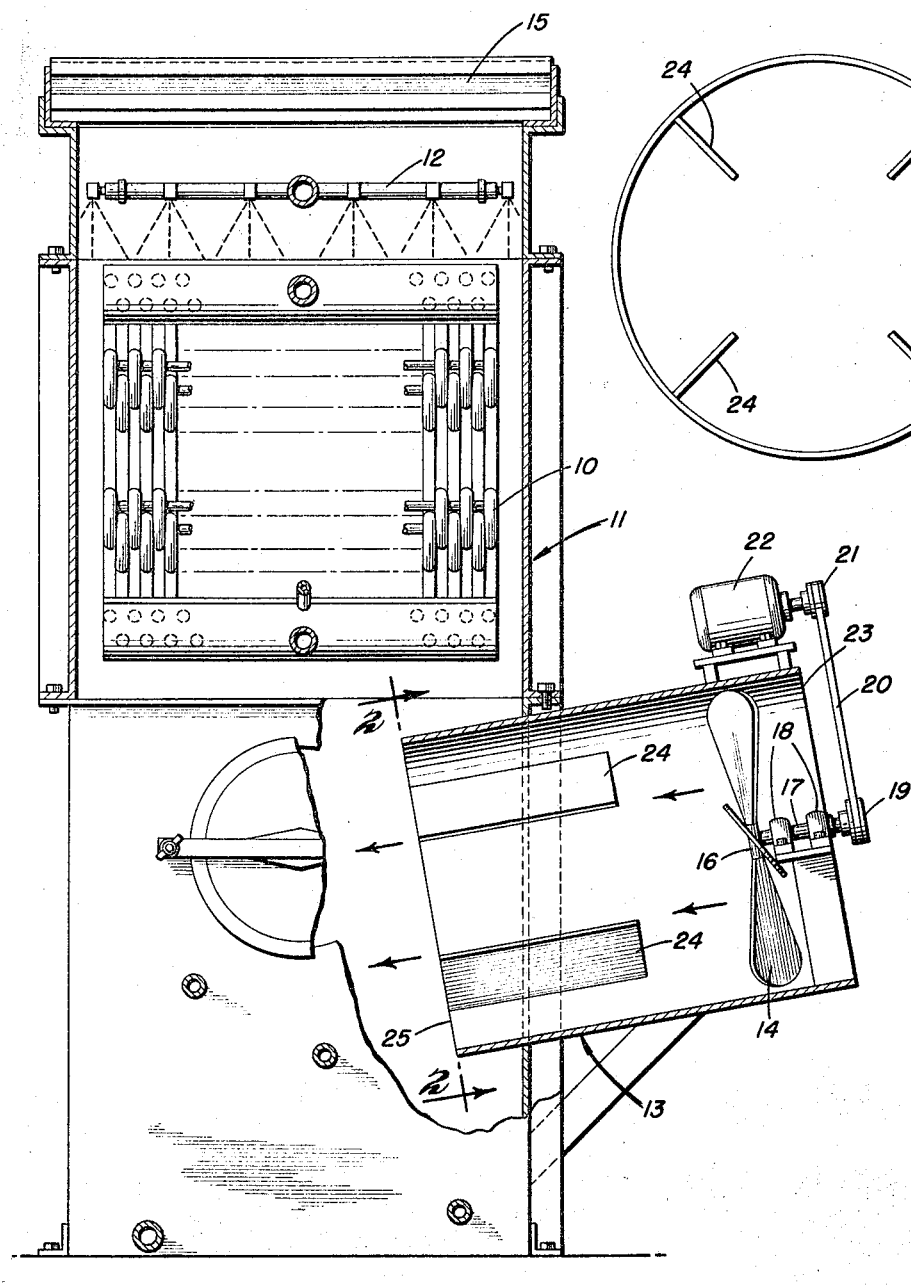
INVENTOR
Wilson E. Bradley
BY
Stevens, Davis, Miller & Mosher
ATTORNEYS

United States Patent Office 3,265,372
Patented August 9, 1966

3,265,372
AIR DISTRIBUTION SYSTEM
Wilson E. Bradley, Baltimore, Md., assignor to Baltimore Aircoil Company, Inc., Baltimore Md., a corporation of Maryland
Filed Feb. 27, 1964, Ser. No. 347,816
2 Claims. (Cl. 261—30)

This invention relates to the propulsion of gases and more particularly to apparatus for controlling the distribution and throw of a body of air leaving a propeller-type fan.

One form of evaporative heat exchanger that has enjoyed wide acceptance in the industry is a blow-through type unit in which air is blown from below countercurrent to drops of water falling through a tube-type heat exchanger in which a refrigerant is condensed or through wet decks from which cooling water is evaporated. A blow-through unit has the inherent advantage that the fan is somewhat protected from moisture because it is dealing with air from the ambient which is relatively dry, whereas a draw-through unit, of necessity, deals with air of very high humidity, by reason of the fact that the air which it pumps has already passed through the heat exchanger and flowed in countercurrent contact with the water spray of the unit. Despite this inherent advantage of the blow-through unit, however, the exclusion of moisture from the fan still presents a problem.

The air discharged by a propeller-type fan flows in a generally helical pattern. This air flow may be passed through a duct to a point more or less centrally below the heat exchanger but even so it is found that there is a central core in the flowing air body which is a region of negative pressure which causes aspiration of water droplets into the fan region where freezing, corrosion, rust, etc., are promoted.

It is, therefore, an object of this invention to provide apparatus for the improvement of blow-through propeller-type fans for evaporative heat exchangers and the like whereby all of the inherent advantages may be maintained and yet providing protection from the aspiration of droplets of water.

A further object of this invention is to provide a fan assembly which is characterized by a very long throw of substantially straight flowing gas.

Other objects and advantages of this invention will be apparent upon consideration of the following detailed description of a preferred embodiment thereof in connection with the annexed drawings wherein:

FIGURE 1 is a view partially in section and partially in elevation of a typical blow-through evaporative heat exchanger unit incorporating an outlet fan ducting constructed in accordance with the principles of the present invention; and FIGURE 2 is an end view of the fan ducting taken along the line 2—2 of FIGURE 1.

Referring now to the drawings in further detail, the numeral 10 represents the tube bank of an evaporative heat exchanger. The tube bank 10 is mounted in a casing 11 below a spray head 12 and above an air duct 13. The duct 13 passes through a side wall of the casing 11 and a propeller fan 14 is mounted near its air inlet end. The apparatus as thus far described is not a part of the present invention and is included here in order that the environment of the present invention may be appreciated.

In use water issues from a plurality of nozzles in the spray head 12 to cover the cross section of the tube group 10 with droplets of water much like a tropical rain. Air issuing from the duct 13, and flowing in the direction of the arrows, moves countercurrent to the water through the tube group 10. Some of the water is evaporated and the heat of vaporization is taken from the refrigerant flowing as the inside phase in the tube group. Thus the refrigerant is condensed and the extracted heat is largely carried out of the top of the casing 10 in the form of heated air and water vapor. The air exhausts through mist eliminators 15 at the top of casing 11.

Having now explained the environment for the present invention, attention is directed to the fan duct 13. The blades of the fan 14 are mounted on a hub 16 which is connected to a shaft 17 mounted in bearings 18. The shaft 17 is provided with a sheave 19 connected by a belt 20 to a sheave 21 on the shaft of a motor 22. Air enters the duct 13 through the end 23 of duct 13 and leaves the blades of fan 14 flowing in a helical pattern with a central core of low pressure. This air engages baffles 24 four of which project radially into the air duct 13 90° apart. The effect of the baffles is to distribute the air uniformly across the cross section of the duct 13 so that at the outlet end 25 (the plane of the line 2—2) the flow is substantially even in all radii.

It has been found that the upstream edge of the baffles 24 should not be closer than approximately two inches from the leaving edge of the fan. The depth of each baffle in a radial sense inward toward the center of the cylindrical fan duct has a minimum value of .05 times the diameter of the fan. If this dimension is increased to .20 times the diameter of the fan the effect is optimum. The minimum axial length of the baffle varies depending on the particular system for which the fan and baffles will be used. The absolute minimum required will be .20 times the fan diameter and may range up to .60 times the fan diameter. Once the minimal requirement for the system is obtained further extension seems to have no significant effect on performance of the baffles.

It appears that the radial baffles 24 which are circumferentially spaced about the inner wall of the fan duct 13 intercept the air as it flows in a generally helical pattern brought about by the rotation of the fan. In other words, the rotating propeller imparts a certain amount of helical movement to the air. Because of this the air has an axial flow component and a radial flow component. The baffles 24 intercept the air which is moving in a helical sense and tend to direct some of this air in the direction of the axial component while other portions of the air are directed radially inwardly or have a component of movement radially inwardly so that in a very short distance downstream from the upstream edge of the baffles the entire cross section of the air flow is free of low pressure regions.

It should be recognized that the axial length of the baffles 24 has to be greater if the resistance to air flow of the heat exchanger is greater, all other variables being constant.

It has been discovered as a part of this invention that if there is no substantial resistance downstream of the fan, the ducting arrangement of the present invention has the effect of giving the fan a tremendous throw. It is believed that the throw results from the fact that the components of the circular or helical movements are taken out of the gas before it leaves the duct so that its dynamic pressure is substantially acting in a direction parallel to the duct. This extensive throw is of considerable utility in installations different from evaporative heat exchangers, for example, in large, cold storage warehouses such fans are of great value in maintaining good air distribution and more even temperature than would normally be possible without a full ducting system.

What is claimed is:

1. In an evaporative heat exchanger of the type where air is blown countercurrent to gravitating water drops through a heat exchange region, the improvement that comprises a propeller-type fan, circular ducting downstream of said fan terminating below the heat exchange region and in the path of the gravitating water, circumferentially spaced baffles extending radially inwardly from the inner surface of said ducting, said baffles being parallel to the long axis of the ducting and beginning at least about 2″ downstream of the fan, the space defined by said ducting being, except for said baffles, free of structures modifying its shape or volume.

2. In an evaporative heat exchanger of the type where air is blown countercurrent to gravitating water drops through a heat exchange region, the improvement that comprises a propeller-type fan, circular ducting downstream of said fan terminating below the heat exchange region and in the path of the gravitating water, circumferentially spaced baffles extending radially inwardly from the inner surface of said ducting, said baffles being parallel to the long axis of the ducting and beginning at least about 2″ downstream of the fan, the radial dimension of said baffles being at least .05 of the diameter of the fan and the axial dimenson being at least .20 of the diameter of the fan, the radial inner edges of said baffles abutting and partially defining a central region of said ducting which is free of obstruction.

References Cited by the Examiner

UNITED STATES PATENTS

| | | | |
|---|---|---|---|
| 1,887,370 | 11/1932 | Bothezat | 230—117 X |
| 1,889,603 | 11/1932 | Johnston | 103—93 X |
| 1,929,411 | 10/1933 | Coey. | |
| 2,398,523 | 4/1946 | De Flon | 261—30 X |
| 2,606,750 | 8/1952 | Jacir. | |
| 2,653,754 | 9/1953 | McDonald | 230—120 X |
| 2,749,024 | 6/1956 | Wilfert | 230—120 X |
| 2,817,475 | 12/1957 | Moody. | |
| 3,065,797 | 11/1962 | Barnes | 261—30 X |
| 3,128,036 | 4/1964 | McBride | 230—120 X |
| 3,132,190 | 5/1964 | Engalitcheff | 261—30 |

HARRY B. THORNTON, *Primary Examiner.*

T. R. MILES, *Assistant Examiner.*